(12) United States Patent
Moberg

(10) Patent No.: US 6,286,048 B1
(45) Date of Patent: Sep. 4, 2001

(54) SYSTEM AND METHOD FOR DISCOVERING RELATIVE STATES OF PROCESSORS

(75) Inventor: Kenneth Moberg, Boulder Creek, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/205,554

(22) Filed: Dec. 4, 1998

(51) Int. Cl.⁷ ........................................... G06F 12/00
(52) U.S. Cl. ............................................. 709/225
(58) Field of Search .................... 709/204, 105, 709/226, 238, 239, 235, 243, 225; 714/11, 13; 370/219, 254, 392

(56) References Cited

U.S. PATENT DOCUMENTS

| | | | |
|---|---|---|---|
| 5,089,958 | 2/1992 | Horton et al. | 395/575 |
| 5,473,599 | * 12/1995 | Li et al. | 370/219 |
| 5,590,724 | 1/1997 | Verdgikovsky | 175/57 |
| 5,815,668 | * 9/1998 | Hashimoto | 709/238 |
| 5,870,557 | * 2/1999 | Bellovin et al. | 709/224 |
| 5,914,953 | * 6/1999 | Krause et al. | 370/392 |
| 6,118,768 | * 9/2000 | Bhatia et al. | 370/254 |

OTHER PUBLICATIONS

Jack Jenney, "Dual RSP—High System Availability SW Functional Spec", Oct. 6, 1995, Cisco Systems, Inc.

* cited by examiner

Primary Examiner—David Wiley
(74) Attorney, Agent, or Firm—Van Pelt & Yi LLP

(57) ABSTRACT

According to an embodiment of the present invention, two routers coupled through a network, such as a local access network (LAN), may be used to serve the function of redundancy to avoid the failure of a connection. The LAN may be used as a backplane to substitute for a bus between two processors. According to an embodiment of the present invention, the two routers may send their medium access control (MAC) addresses to each other and compare these MAC addresses. The router associated with the MAC address that meets a predetermined criteria may be deemed as a primary router and the other router can be deemed as a secondary router. An example of meeting the predetermined criteria is the router associated with the lower MAC address. Once processor states, such as stand alone, primary, and secondary, are established for the two routers, the primary router may serve the function of a standard router, while the secondary router monitors the health of the primary router and becomes a primary router should the original primary router have a failure.

17 Claims, 6 Drawing Sheets

SYSTEM AND METHOD FOR DISCOVERING RELATIVE STATES OF PROCESSORS

CROSS REFERENCE TO RELATED APPLICATION

This application is related to U.S. patent application Ser. No. 09/205,577, entitled SYSTEM AND METHOD FOR ESTABLISHING PROCESSOR REDUNCANCY, filed Dec. 4, 1998, which is assigned to Cisco Technology, and is herein incorporated by reference.

FIELD OF THE INVENTION

The present invention is related to network protocols. In particular, the present invention relates to a protocol for discovering relative states for processors.

BACKGROUND OF THE INVENTION

A network is a communication system that allows users to access resources on other computers and exchange messages with other users. A network is typically a data communication system that links two or more computers and peripheral devices. It allows users to share resources on their own systems with other network users and to access information on centrally located systems or systems that are located at remote offices. It may provide connections to the Internet or the networks of other organizations. The network typically includes a cable that attaches to network interface cards (NIC) in each of the devices within the network. Users may interact with network-enabled software applications to make a network request (such as to get a file or print on a network printer). The application may also communicate with the network software and network software then may interact with the network hardware to transmit information to other devices attached to the network.

A local area network (LAN) is a network that is located in a relatively small area, such as a department or building. A LAN typically includes a shared medium to which workstations attach and communicate with one another by using broadcast methods. With broadcasting, any device on the LAN can transmit a message that all other devices on the LAN can listen to. The device to which the message is addressed actually receives the message. Data is typically packaged into frames for transmission on the LAN.

FIG. 1 is a block diagram illustrating a network connection between a user 10 and a particular web page 20. This Figure is an example which may be consistent with any type of network, including a LAN, a wide are network (WAN), or a combination of networks, such as the Internet.

When a user 10 connects to a particular destination, such as a requested web page 20, the connection from the user 10 to the web page 20 is typically routed through several routers 12A–12D. Routers are internetworking devices. They are typically used to connect similar and heterogeneous network segments into Internetworks. For example, two LANs may be connected across a dial-up, integrated services digital network (ISDN), or a leased line via routers. Routers may also be found throughout the Internet. End users may connect to a local Internet service provider (ISP) (not shown), which are typically connected via routers to regional ISPs, which are in turn typically connected via routers to national ISPs.

If a router, such as router 12C, fails and is no longer able to route the desired connection, then the desired connection between the user 10 the desired web page 20 may be significantly delayed or unable to connect at all.

To avoid this problem, a solution has been implemented by router manufacturers, such as Cisco Systems, that include two processors, a primary processor and a secondary processor, such that the secondary processor may take over as the main processor if the primary processor has either a hardware or software failure. Accordingly, such a solution provides redundancy to avoid failure of the router.

Although this solution works well, it may be desirable for many companies to avoid buying a specialized router with built in redundancy and simply use their existing routers for the same purpose. The present invention addresses such a need.

SUMMARY OF THE INVENTION

According to an embodiment of the present invention, two routers coupled through a network, such as a local access network (LAN), may be used to serve the function of redundancy to avoid the failure of a connection. The LAN may be used as a backplane to substitute for a bus between two processors. According to an embodiment of the present invention, the two routers may send their medium access control (MAC) addresses to each other and compare these MAC addresses. The router associated with the MAC address that meets a predetermined criteria may be deemed as a primary router and the other router can be deemed as a secondary router. An example of meeting the predetermined criteria is the router associated with the lower MAC address. Once processor states, such as stand alone, primary, and secondary, are established for the two routers, the primary router may serve the function of a standard router, while the secondary router monitors the health of the primary router and becomes a primary router should the original primary router have a failure.

A method according to an embodiment of the present invention for determining a state of a processor is presented. The method comprises providing a first criteria and a second criteria, wherein the first criteria is associated with a first device and the second criteria is associated with a second device, and wherein the first device and second device are coupled to each other. the method also compares the first criteria and the second criteria; and determines a first state for the first device.

A system according to an embodiment of the present invention for determining a state of a processor is also presented. The system comprises a first device providing a first criteria. The system also includes a second device coupled with the first device, the second device providing a second criteria. A processor is coupled with the first device. The processor is configured to compare the first criteria and the second criteria; and the processor is also configured to determine a first state for the first device.

Another system according to an embodiment of the present invention for determining a state of a processor is presented. The system comprises a processor that is configured to provide a first criteria and receive a second criteria. The first criteria is associated with a first device and the second criteria is associated with a second device. The processor is also configured to compare the first criteria and the second criteria, and determine a first state for the first device. A memory is coupled to the processor for providing instructions to the processor.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
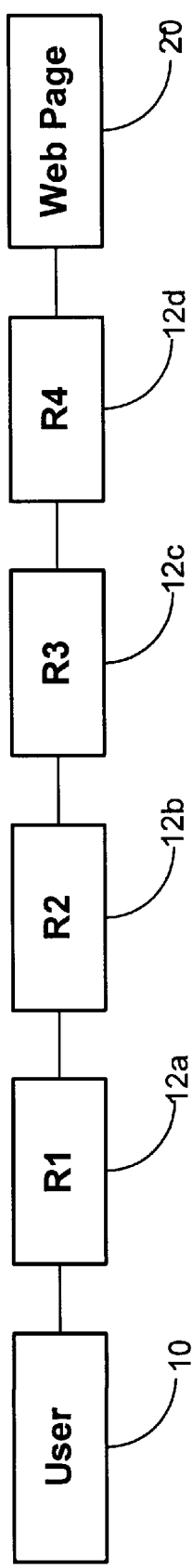
FIG. 1 is a block diagram of an example of a network connection between a user and a web page.
Figure 2:
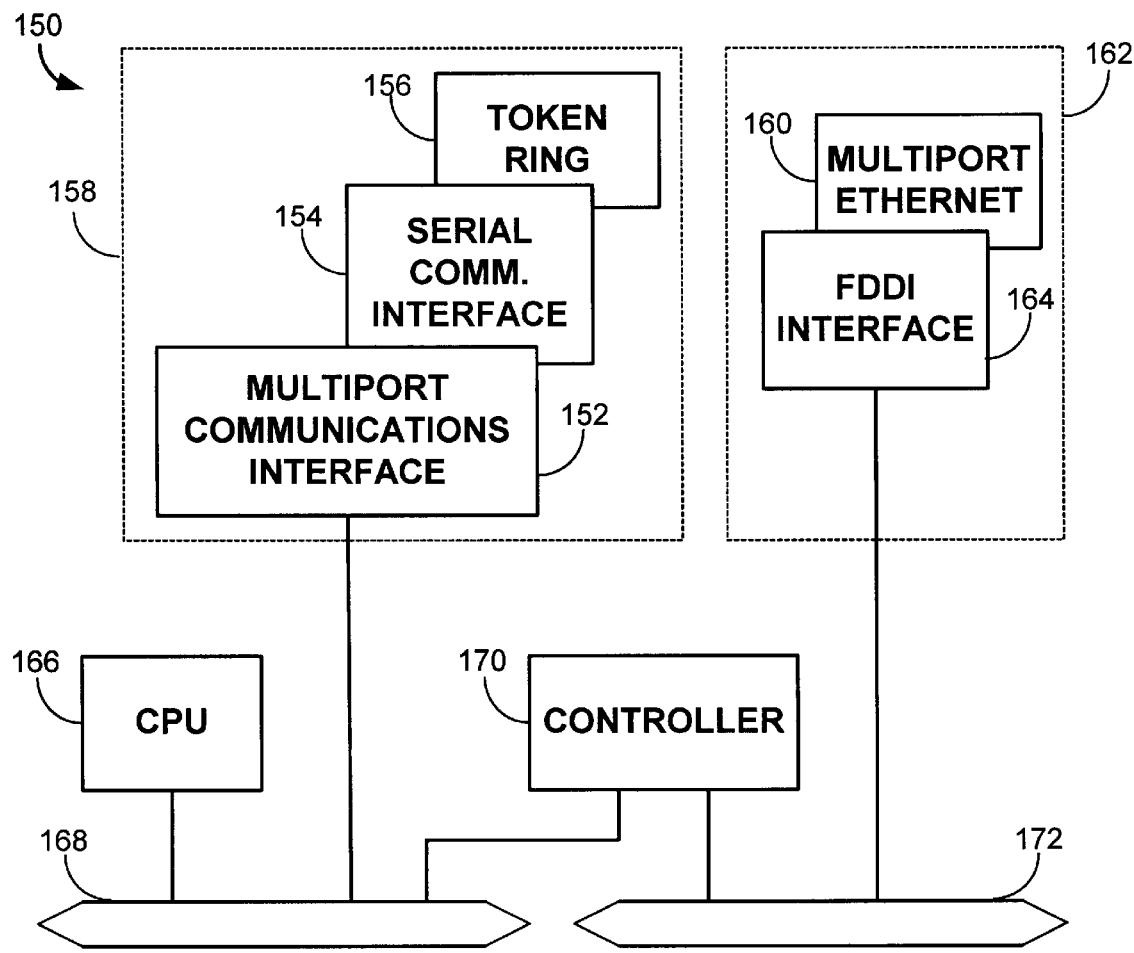
FIG. 2 is a block diagram of an example of a router suitable for implementing an embodiment of the present invention.

FIG. 2 is a block diagram of an example of a router suitable for implementing an embodiment of the present invention. The router 150 is shown to include a master central processing unit (CPU) 166, low and medium speed interfaces 158, and high speed interfaces 162. The CPU 166, may be responsible for such router tasks as routing table computations and network management. It may include one or more microprocessor chips selected from complex instruction set computer (CISC) chips (such as the Motorola 68040 Microprocessor), reduced instructions set computer (RISC) chips, or other available chips. Non-volatile RAM and/or ROM may also form part of CPU 166. However, there are many different ways in which memory can be coupled to the system.

The interfaces 158 and 162 are typically provided as interface cards. Generally, they control the sending and receipt of data packets over the network and sometimes support other peripherals used with the router 150. Examples of interfaces that may be included in the low and medium interfaces 158 include a multiport communications interface 152, a serial communications interface 154, and a token ring interface 156. Examples of interfaces that may be included in the high speed interfaces 162 include a fiber distributed data interface (FDDI) 164 and a multiport Ethernet interface 160. Each of these interfaces (low/medium and high speed) may include (1) a plurality of ports appropriate for communication with the appropriate media, and (2) an independent processor such as the 2901 bit slice processor (available from Advanced Micro Devices Corporation of Santa Clara, Calif.), and in some instances (3) volatile RAM. The independent processors control such communication intensive tasks as packet switching and filtering, and media control and management. By providing separate processors for the communication intensive tasks, this architecture permits the master microprocessor 166 to efficiently perform routing computations, network diagnostics, security functions, etc.

The low and medium speed interfaces are shown to be coupled to the master CPU 166 through a data, control, and address bus 168. High speed interfaces 162 are shown to be connected to the bus 168 through a fast data, control, and address bus 172 which is in turn connected to a bus controller 170. The bus controller functions are provided by a processor such as a 2901 bit slice processor.

Although the system shown in FIG. 2 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 3:
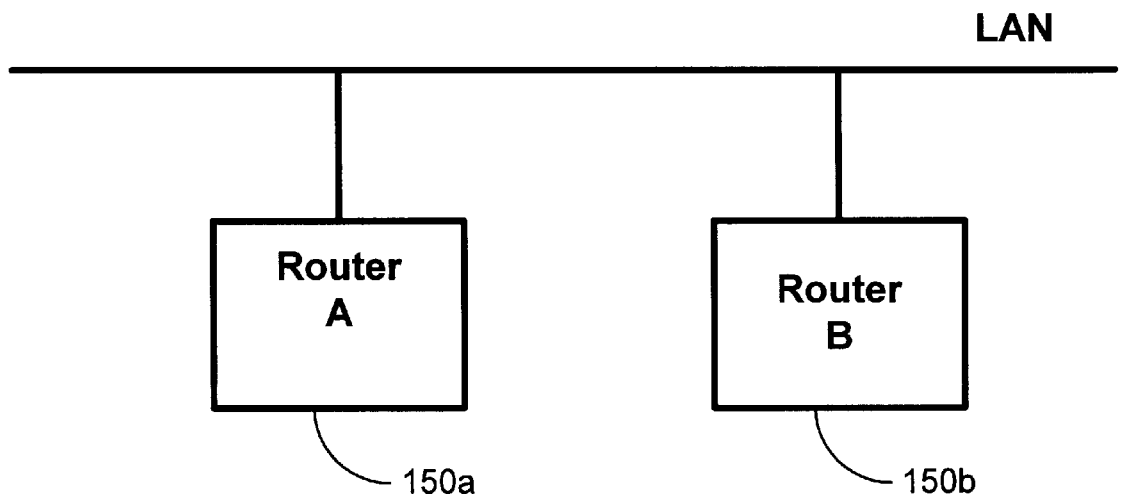
FIG. 3 is a block diagram of a system of routers suitable for implementing an embodiment of the present invention.

FIG. 3 is a block diagram of a system of routers suitable for implementing an embodiment of the present invention. In this example, a first router 150A is coupled with a second router 150B through a network connection, such as a local access network (LAN). In this system, router 150A and router 150B may provide redundancy by acting as a unit with the LAN backplane being used as a substitute bus. One of these routers 150A, 150B may be determined as a primary router while the remaining router is determined as a secondary router. The main function of the primary router is to act as a stand alone router, for example by routing connections to a requested destination. The main function of the secondary router is to monitor the health of the primary router until a failure is detected. The failure of the primary router may be either a software failure or a hardware failure. Once a failure of the primary router is detected, the secondary router takes over as the new primary router. Accordingly, redundancy is used to ensure reliability. For further details of processor redundancy, U.S. patent application Ser. No. 09/205,577 entitled SYSTEM AND METHOD FOR ESTABLISHING PROCESSOR REDUNDANCY, filed Dec. 4, 1998, which is herein incorporated by reference may be referred.

Figure 4A:
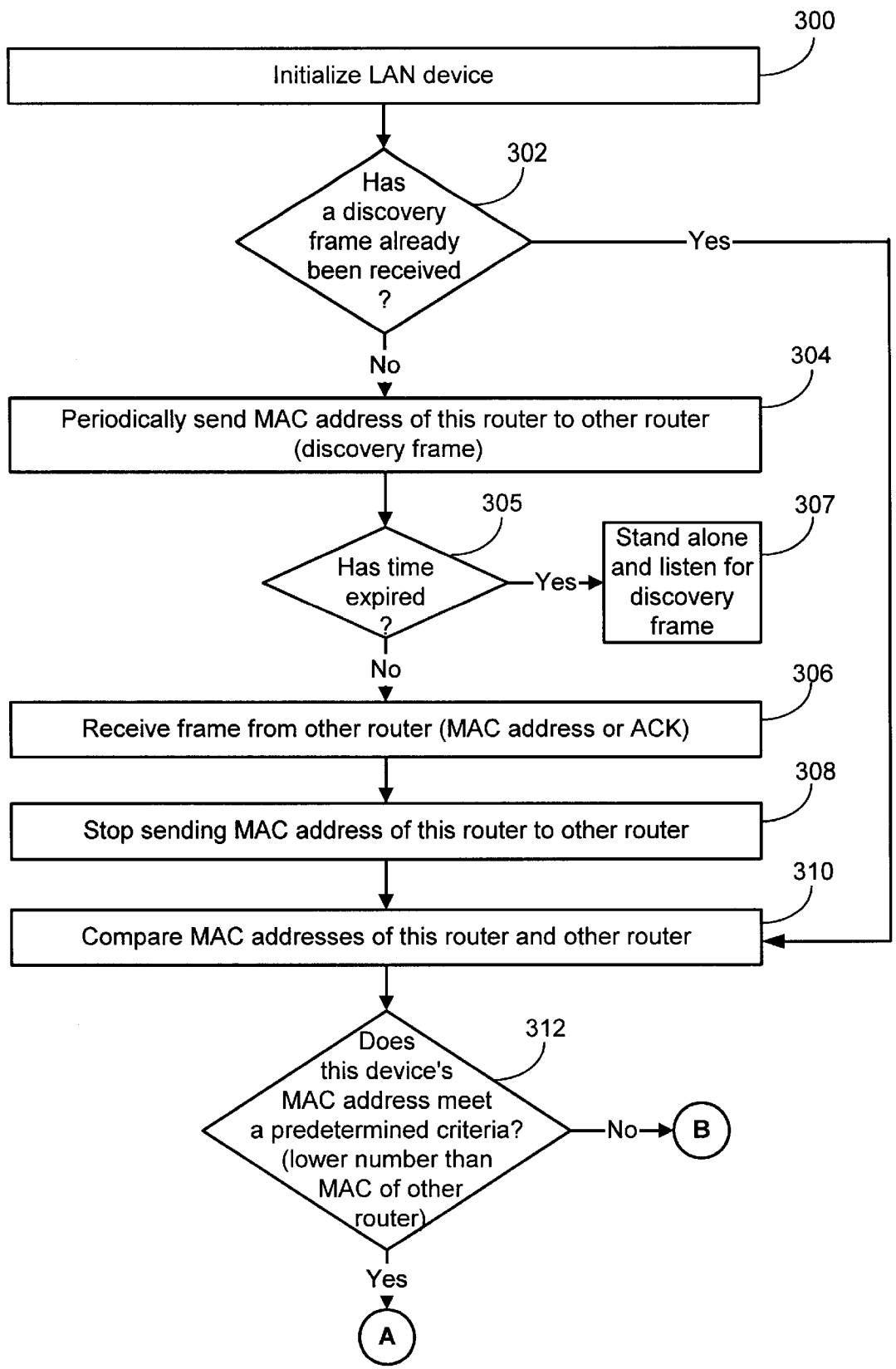
FIGS. 4A–4B are flow diagrams of a method according to an embodiment of the present invention for determining a primary and a secondary router.
Figure 4B:
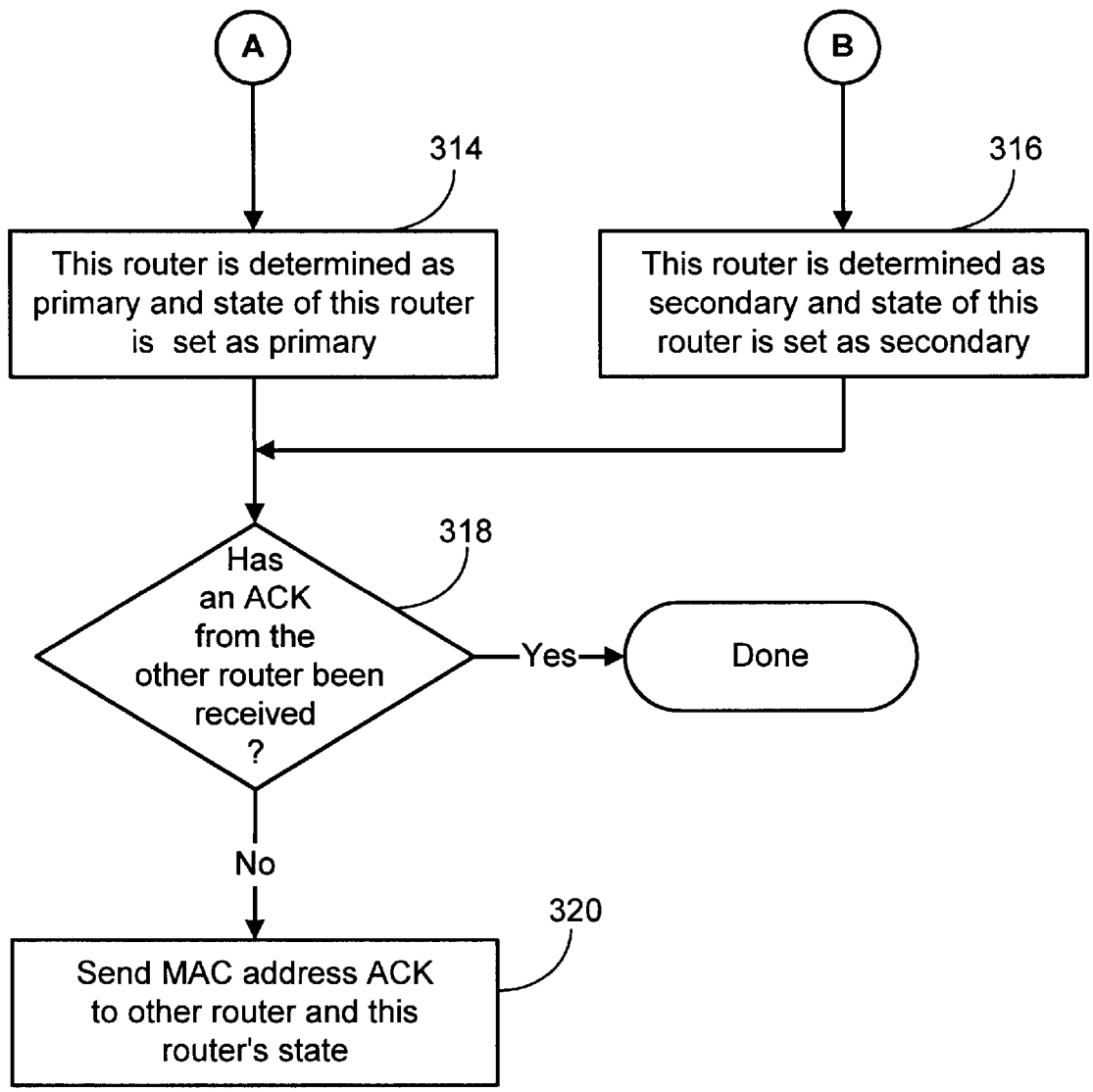

FIGS. 4A–4B are flow diagrams of a method according to an embodiment of the present invention for determining a primary and secondary router. Each router in the system of routers, such as the system shown in FIG. 3, preferably performs the method exemplified in FIGS. 4A–4B. A network device, such as a LAN device, is initialized, (step 300). An example of a LAN device is an Ethernet card. Initialization of a LAN device is well known in the art. The initialization of the LAN device may occur after the router hardware has been initialized.

It is then determined whether a discovery frame has already been received (step 302). The discovery frame would be a packet received from another router, such as router 150B of FIG. 3. Further details of the discovery frame will later be discussed in conjunction with FIG. 5.

If there is no discovery frame that has already been received, the medium access control (MAC) address of this router (such as router 150A of FIG. 3 which is performing the method exemplified in FIGS. 4A–4B) is then periodically sent to the other router (such as router 150B which is also performing this method) (step 304). An example of the time period between the sending of the MAC address of this router is every one second. The MAC address may be sent via a discovery frame, which will later be discussed in conjunction with FIG. 5.

It is then determined whether a predetermined time period has expired (step 305). The routers participating in the primary/secondary router system may be identified by being powered on within a predetermined time of each other. An example of the predetermined time is approximately 30 seconds. When a router is powered on, it may have a predetermined time period, such as approximately 30 seconds, during which the MAC address of this router is sent periodically. If the time period has expired, then this router acts as a stand alone router (step 307). Optionally, once the router acts as a stand alone router, it may listen for a discovery frame in case another router sends its MAC address over to this router.

The other router that is expected to send a MAC address to this router should be on the same local access network (LAN) segment with this router. A LAN segment may be a logical grouping where all frames sent in that LAN segment can be seen by any device on that segment.

A discovery frame is then received from the other router (step 306). The received discovery frame will include either a MAC address or an acknowledgement (ACK) from the other router indicating that this router's discovery frame has been received (step 306). Once a discovery frame has been received, this router stops sending its MAC address to the other router (stop periodically sending this router's discovery frame) (step 308). The MAC address of this router is then compared to the received MAC address of the other router (step 310).

If a discovery frame had already been received when the LAN device was initialized (step 302), then the MAC address of the this router is compared to the MAC address of the other router (step 310), without the need to initiate the sending and receiving the discovery frames (steps 304–308).

It is then determined whether this device's MAC address meets a predetermined criteria (Step 312). An example of meeting a predetermined criteria is if this device's MAC address is a lower number than the MAC address of the other router (step 312). If this device's MAC address meets the predetermined criteria, then this router is determined as the primary router and a state of this router is set as primary (step 314). If this device's MAC address does not meet the predetermined criteria (step 312), then this router is determined as a secondary router and the state of this router is set as secondary (step 316).

Examples of options for the state of this router include stand alone, primary, and secondary. Stand alone is a state indicating that the router is functioning without redundancy. Primary is a state indicating that the router acts as the primary router. Secondary is a state indicating that the router is acting as a secondary router and monitoring the health of a primary router.

Once the state of the router has been determined, it is then determined whether an acknowledgement (ACK) from the other router has been received (step 318). The acknowledgement from the other router would include the acknowledgement of having received this router's MAC address and this router's state. If an ACK from the other router has been received then this process is complete. If, however, an ACK has not been received from the other router, then an ACK is sent from this router to the other router indicating this router's MAC address and this router's state (step 320).

Each of the routers involved in this system, such as the system shown in FIG. 3, performs the method exemplified in FIGS. 4A–4B. Accordingly, each of the routers determine their state, with the result of one of the routers being a primary router and the remaining router being a secondary router.

Figure 5:
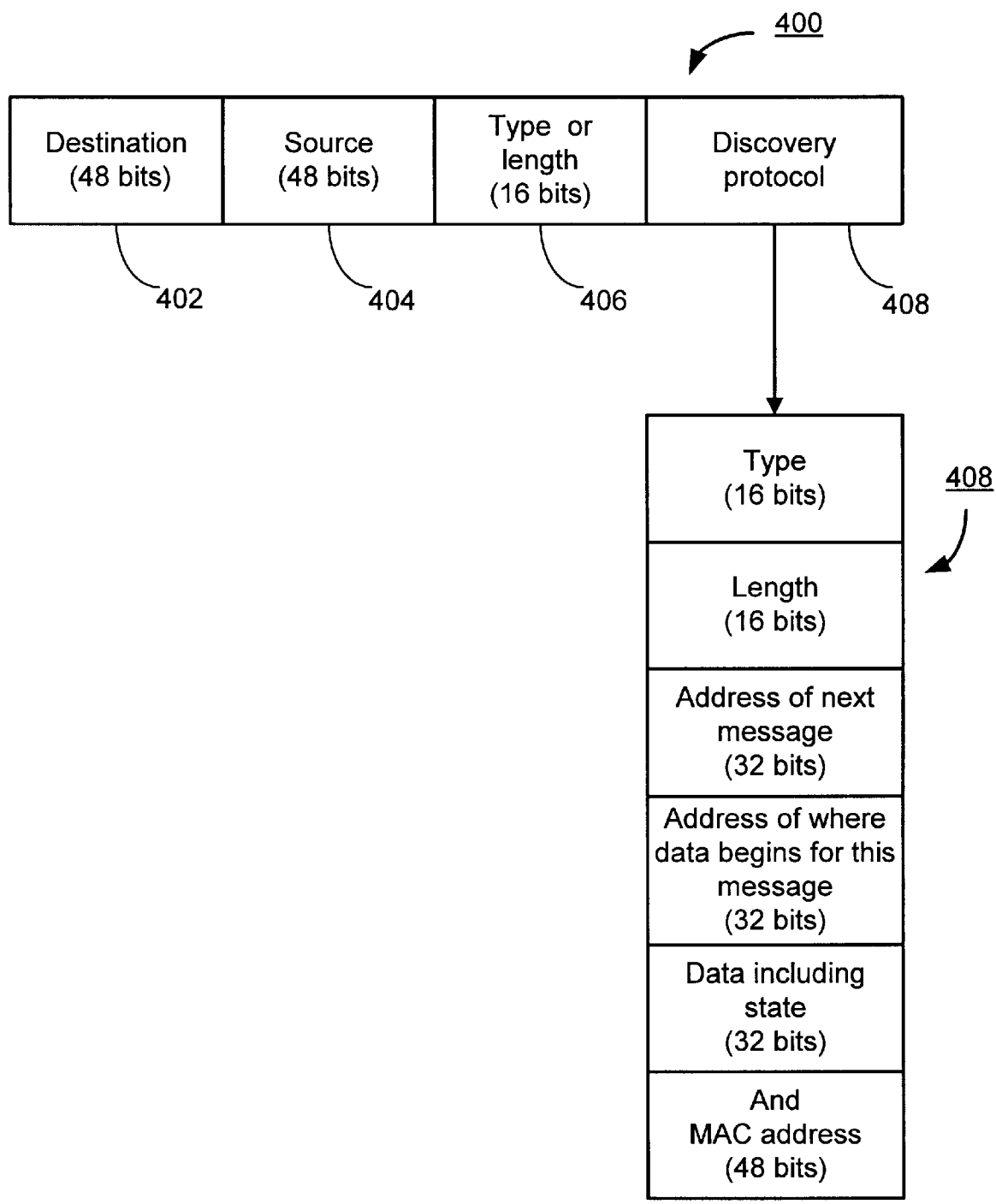
FIG. 5 is an illustration of a packet frame which may be used in accordance with an embodiment of the present invention.

FIG. 5 is an example of a discovery frame according to an embodiment of the present invention. The discovery frame 400 is shown to include a destination 402, a source 404, a type or length 406 and a discovery protocol 408. The destination 402 may indicate the destination router to which the discovery frame is sent, such as router 150B of FIG. 3. An example of the size of the destination 402 is 48 bits. The source 404 may be the source router from which the discovery frame originates, such as router 150A of FIG. 3. An example of the size of the source 404 is 48 bits. The type or length 406 may indicate either the length of the frame 400 or the type of frame, for example a protocol number indicating that this is a discovery frame. An example of the size of the type or length is 16 bits. The discovery protocol 408 is shown to include a type, a length, an address of the next message, an address of where the data begins for this message, and the data of this message including the router state and the MAC address. Examples of the sizes of these fields in the discovery protocol 408 include 16 bits for type, 16 bits for length, 32 bits for the address of the next message, 32 bits for the address of where the data begins for this message, 32 bits for the router state, and 48 bits for the MAC address.

A method and system for determining relative states of processors in a system such as a system of routers has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed:

1. A method for determining a state of a router comprising:

providing a first criteria and a second criteria, wherein the first criteria is associated with a first router and the second criteria is associated with a second router, and wherein the first router and second router are coupled to each other;

comparing the first criteria and the second criteria; and determining whether the first router is a primary router, wherein the primary router serves a function of a standard router.

2. The method of claim 1, wherein the first criteria is a medium access control (MAC) address.

3. The method of claim 1, wherein the first router and the second router are coupled to each other in a network environment.

4. The method of claim 1, wherein the first router is a primary router if the first criteria meets a predetermined criteria better than the second criteria.

5. The method of claim 1, wherein the first router is a secondary router if the second criteria meets a predetermined criteria better than the first criteria.

6. The method of claim 1, wherein a frame is sent by the first router to the second router to indicate the first criteria.

7. The method of claim 1, wherein a frame is sent by the second router to the first router to indicate the second criteria.

8. A system for determining a state of a router comprising:

means for providing a first criteria and a second criteria, wherein the first criteria is associated with a first router and the second criteria is associated with a second router, and wherein the first router and second router are coupled to each other;

means for comparing the first criteria and the second criteria; and determining whether the first router is a primary router, wherein the primary router serves a function of a standard router.

9. A system for determining a state of a processor comprising:
   a first router providing a first criteria;
   a second router coupled with the first router, the second router providing a second criteria; wherein the second router includes a processor, the processor being configured to compare the first criteria and the second criteria, and the processsor also being configured to determine whether the second router is a primary router, wherein the primary router serves a function of a standard router.

10. A system for determining a state of a processor comprising:
   a processor being configured to provide a first criteria and receive a second criteria, wherein the first criteria is associated with a first router and the second criteria is associated with a second router; the processor also being configured to compare the first criteria and the second criteria, and determine the first router is a primary router, wherein the primary router serves a function of a standard router; and
   a memory coupled to the processor for providing instructions to the processor.

11. The system of claim 10, wherein the first criteria is a medium access control (MAC) address.

12. The system of claim 10, wherein the first router and the second router are coupled to each other in a network environment.

13. The system of claim 10, wherein the first router is a primary router if the first criteria meets a predetermined criteria better than the second criteria.

14. The system of claim 10, wherein the first router is a secondary router if the second criteria meets a predetermined criteria better than the first criteria.

15. The system of claim 10, wherein a frame is sent by the second router to the first router to indicate the second criteria.

16. A computer program product for determining a state of a, router comprising:
   computer code providing a first criteria and a second criteria, wherein the first criteria is associated with a first router and the second criteria is associated with a second router, and wherein the first router and second router are coupled to each other;
   computer code comparing the first criteria and the second criteria;
   computer code determining whether the first router is a primary router, wherein the primary router serves a function of a standard router.

17. The computer program product of claim 16, wherein the computer readable medium is selected from the group consisting of CD-ROM, floppy disk, tape, flash memory, system memory, hard drive, and data signal embodied in a carrier wave.

* * * * *